(12) United States Patent
Lohia et al.

(10) Patent No.: US 10,599,783 B2
(45) Date of Patent: Mar. 24, 2020

(54) AUTOMATICALLY SUGGESTING A TEMPORAL OPPORTUNITY FOR AND ASSISTING A WRITER IN WRITING ONE OR MORE SEQUEL ARTICLES VIA ARTIFICIAL INTELLIGENCE

(71) Applicant: International Business Machines Corporation, Armonk, NY (US)

(72) Inventors: Pranay Lohia, Bangalore (IN); Saket Gurukar, Bangalore (IN); Rishabh Gupta, Bangalore (IN); Himanshu Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/854,073

(22) Filed: Dec. 26, 2017

(65) Prior Publication Data
US 2019/0197120 A1 Jun. 27, 2019

(51) Int. Cl.
*G06F 17/27* (2006.01)
*G06F 17/28* (2006.01)
(Continued)

(52) U.S. Cl.
CPC ........ *G06F 17/2881* (2013.01); *G06F 17/274* (2013.01); *G06F 17/2765* (2013.01);
(Continued)

(58) Field of Classification Search
CPC ....................................................... G06F 17/27
(Continued)

(56) References Cited

U.S. PATENT DOCUMENTS 5,500,881 A * 3/1996 Levin ........................ G06F 8/71
717/114
5,604,855 A 2/1997 Crawford
(Continued)

FOREIGN PATENT DOCUMENTS

WO 2010020085 A1 2/2010

OTHER PUBLICATIONS

Perez et al., Mexica: A computer model of a cognitive account of creative writing, Journal of Experimental & Theoretical Artificial Intelligence 13(2):119-139, Apr. 2001.
(Continued)

*Primary Examiner* — Michael C Colucci
(74) *Attorney, Agent, or Firm* — Ryan, Mason & Lewis, LLP (57) ABSTRACT

Methods, systems, and computer program products for automatically suggesting a temporal opportunity for writing one or more sequel articles via artificial intelligence are provided herein. A computer-implemented method includes extracting one or more types of information from a prior written document; automatically determining, based on the extracted information, at least one temporal opportunity for generating a follow-up written document to the prior written document; automatically generating a follow-up written document to the prior written document, the follow-up written document being written in a style that indicates that it is in response to the prior written document, in accordance with the at least one determined temporal opportunity, and based on (i) one or more items of information, related to the extracted information, derived from one or more web sources, and (ii) a writing model attributed to a user.

20 Claims, 6 Drawing Sheets

(51) Int. Cl.
*G06N 5/02* (2006.01)
*G06N 20/00* (2019.01)

(52) U.S. Cl.
CPC ......... *G06F 17/2785* (2013.01); *G06N 5/022* (2013.01); *G06N 20/00* (2019.01); *G06F 17/278* (2013.01)

(58) Field of Classification Search
USPC ............ 704/9; 707/613, 690, 722, 724, 754; 717/105, 141; 382/312
See application file for complete search history.

(56) References Cited

U.S. PATENT DOCUMENTS

| | | | |
|---|---|---|---|
| 6,961,692 B1* | 11/2005 | Polanyi | G06F 17/279 704/1 |
| 7,333,967 B1 | 2/2008 | Bringsjord et al. | |
| 7,908,132 B2* | 3/2011 | Brockett | G06F 17/289 704/1 |
| 8,380,491 B2* | 2/2013 | Leacock | G09B 7/00 704/9 |
| 8,479,094 B2 | 7/2013 | Fouts | |
| 8,694,953 B2* | 4/2014 | Khodabandehloo | G06F 8/20 715/717 |
| 8,914,387 B2* | 12/2014 | Weyerhaeuser | G06F 16/24542 707/754 |
| 8,972,324 B2 | 3/2015 | Reddy et al. | |
| 8,990,235 B2 | 3/2015 | King et al. | |
| 9,318,108 B2 | 4/2016 | Gruber et al. | |
| 9,396,483 B2 | 7/2016 | Hamedi | |
| 10,007,936 B1* | 6/2018 | Ghoshal | G06Q 50/01 |
| 2001/0010329 A1* | 8/2001 | Ohashi | G06F 17/277 235/375 |
| 2004/0247207 A1* | 12/2004 | Silverbrook | B41J 2/17503 382/312 |
| 2006/0294066 A1* | 12/2006 | Dettinger | G06F 16/2477 |
| 2007/0118802 A1 | 5/2007 | Gerace et al. | |
| 2008/0120129 A1* | 5/2008 | Seubert | G06Q 10/06 705/35 |
| 2009/0100096 A1* | 4/2009 | Erlichson | H04L 67/02 |
| 2010/0057772 A1* | 3/2010 | Manolescu | G06Q 30/02 707/E17.055 |
| 2011/0086331 A1 | 4/2011 | Karov Zangvil | |
| 2011/0295903 A1 | 12/2011 | Chen | |
| 2012/0284290 A1 | 11/2012 | Keebler et al. | |
| 2015/0324422 A1* | 11/2015 | Elder | G06F 17/279 707/722 |
| 2015/0356116 A1* | 12/2015 | Lin | G06F 16/184 707/613 |
| 2016/0004718 A1* | 1/2016 | Lin | G06F 16/1774 707/690 |
| 2016/0103875 A1 | 4/2016 | Zupancic | |
| 2016/0162456 A1* | 6/2016 | Munro | G06F 16/35 704/9 |
| 2016/0179968 A1 | 6/2016 | Ormseth et al. | |
| 2016/0188733 A1* | 6/2016 | Glover | G06F 16/9535 707/724 |
| 2016/0342685 A1* | 11/2016 | Basu | G06F 16/367 |
| 2017/0235724 A1* | 8/2017 | Grewal | G06F 17/274 704/9 |
| 2017/0315978 A1* | 11/2017 | Boucher | G06F 17/245 |
| 2017/0315979 A1* | 11/2017 | Boucher | G06F 7/544 |

OTHER PUBLICATIONS

Hu et al., Controllable Text Generation, Mar. 2017.
Oliveira, H. PoeTryMe: a versatile platform for poetry generation, 2012.
Montfort, N., Creative Text Generators of Different Scales, Jan. 2012.
Xu et al. "Paraphrasing for style." 24th International Conference on Computational Linguistics, COLING 2012.
Manuel, T., The Content Corner: Can Automated Content Creation Help Your Agency?, https://www.digitalgov.gov/2015/08/10/the-content-corner-can-automated-content-creation-help-your-agency/, Aug. 10, 2015.
Varma, K., In a First, Robot Reporter Gets Its News Article Published, http://www.outlookindia.com/newswire/story/in-a-first-robot-reporter-gets-its-news-article-published/964797, Jan. 19, 2017.
Smith, J., IBM Research Takes Watson to Hollywood with the First "Cognitive Movie Trailer," https://www.ibm.com/blogs/think/2016/08/cognitive-movie-trailer/, Aug. 31, 2016.
White, G., Artificial Intelligence Will Disrupt the Creative Industry, http://www.ogilvypr.com.au/uncategorized/artificial-intelligence-will-disrupt-the-creative-industry/, Dec. 7, 2016.
Levine, B., IBM Announces Watson-Powered Ads That Think, http://marketingland.com/ibm-announces-watson-powered-ads-think-179596, Jun. 2, 2016.
Finley, K., This News-Writing Bot is Now Free for Everyone, https://www.wired.com/2015/10/this-news-writing-bot-is-now-free-for-everyone/, Oct. 20, 2015.
Holmes, J., AI is Already Making Inroads into Journalism But Could it Win a Pulitzer, https://www.theguardian.com/media/2016/apr/03/artificla-intelligence-robot-reporter-pulitzer-prize, Apr. 3, 2016.
Liberatore, S., Your Days Could Be Numbered if You're a Sports Writer. The Associated Press is using AI to write Minor League Baseball articles, http://www.dailymail.co.uk/sciencetech/article-3668837/Your-days-numbered-sports-writer-Associated-Press-using-AI-write-Minor-League-Baseball-articles.html, Jul. 1, 2016.
Miller, R., AP's Robot Journalists are Writing Their Own Stories now, http://www.theverge.com/2015/1/29/7939067/ap-journalism-automation-robots-financial-reporting, Jan. 29, 2015.
Nield, D., A Novel Written by AI Passes the First Round in a Japanese Literary Competition, http://www.sciencealert.com/a-novel-written-by-ai-passes-the-first-round-in-a-japanese-literary-competition, Mar. 24, 2016.
Don Johnston, Human Learning Tools, Co-Writer, http://donjohnston.com/cowriter/, 2017.
Pieters et al., CreativeAI: On the Democratisation and Escalation of Creativity, https://medium.com/@ArtificialExperience/creativeai-9d4b2346faf3#.qarqoeji0, Mar. 7, 2016.

\* cited by examiner

AUTOMATICALLY SUGGESTING A TEMPORAL OPPORTUNITY FOR AND ASSISTING A WRITER IN WRITING ONE OR MORE SEQUEL ARTICLES VIA ARTIFICIAL INTELLIGENCE

FIELD

The present application generally relates to information technology, and, more particularly, to artificial intelligence (AI) technology.

BACKGROUND

Written documents can be, at least in part, generated automatically via one or more existing approaches. However, creating subsequent creative content in continuation of, or in response to, an original piece of written content, and identifying when to create such content, remain manual and labor-intensive processes.

SUMMARY

In one embodiment of the present invention, techniques for automatically suggesting a temporal opportunity for writing one or more sequel articles via artificial intelligence are provided. An exemplary computer-implemented method can include extracting one or more types of information from a prior written document; automatically determining, based on the extracted information, at least one temporal opportunity for generating a follow-up written document to the prior written document; and automatically generating a follow-up written document to the prior written document, the follow-up written document being written in a style that indicates that it is in response to the prior written document, in accordance with the at least one determined temporal opportunity, and based on (i) one or more items of information, related to the extracted information, derived from one or more web sources, and (ii) a writing model attributed to a user.

In another embodiment of the invention, an exemplary computer-implemented method can include automatically suggesting, based one or more types of information extracted from a prior written document, a temporal opportunity for generating a follow-up written document to the prior written document. Such a method also includes automatically generating, at the suggested temporal opportunity, a follow-up written document to the prior written document based on (i) one or more items of information, related to the extracted information, derived from one or more web sources, and (ii) a writing model attributed to a user. Additionally, such a method includes displaying the generated follow-up written document to the user, enabling the user to edit the generated follow-up written document, automatically generating an updated version of the follow-up written document based on editing carried out by the user, and outputting the updated version of the follow-up written document to the user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes automatically suggesting a temporal opportunity for writing one or more sequel articles via artificial intelligence. As used herein, the term "author" refers to an individual who writes an article. As detailed herein, at least one embodiment of the invention includes automatically determining and/or identifying an appropriate time for writing a sequel to a prior article. By way merely of example, assume that a user writes a post P on demonetization. One or more embodiments of the invention can include identifying a future prediction mentioned in post P such as, for example, a growth rate getting below 5% in the coming months. Additionally, such an embodiment can subsequently include monitoring multiple web sources to determine if the and/or when the noted growth rate falls below 5%. If it is observed and/or determined that the noted growth rate indeed does fall below 5%, such an embodiment includes raising an alert (and outputting such an alert to the user). Also, in one or more embodiments of the invention, such an alert (also referred to herein as a trigger) is raised to suggest that the user generate follow-up (sequel) content.

Additionally, at least one embodiment of the invention includes generating a sequel to an article based on the information and context mentioned in the article and the author's creative writing model. The sequel article is generated in a manner so as it is clear that the sequel article is a follow-up to a prior article. The sequel article makes relevant references to the prior article as well. Once an opportunity for writing a sequel article is identified, such an embodiment can also include automatically generating illustrative content of a sequel article and presenting it to the author for his or her review. The author can choose to edit this sequel article, re-write the sequel article from scratch, etc. One or more embodiments of the invention can include extracting context information, one or more bases for a sequel article, one or more stated facts, one or more noted entity-event relationships, etc. from the prior article. From this context, such an embodiment can include generating a sequel article.

Also, one or more embodiments of the invention can additionally include generating the sequel article in a particular writing style that is similar to the style of the original/prior article and/or the style of the author, such that the sequel article can serve as an extension to the original/prior article and/or the author's writing model.

As also described herein, at least one embodiment of the invention can include assisting the author/writer in editing the generated sequel article/content. As noted above, once a sequel article is generated, the author can decide to write/re-write the entire sequel article from scratch, re-write parts of the sequel article, and/or edit one or more portions of the sequel article. The author can query why a certain piece of information has been included in the generated sequel article, and can also request the system to fetch additional data concerning a piece of information in the sequel article. In conjunction with this process, one or more embodiments of the invention can also include generating and providing (to the user/author) an explanation for why this is the appropriate time for writing the sequel article.

As noted above and further detailed herein, a "sequel" article can include a follow-up article to a prior or original article. At least one embodiment of the invention includes automatically identifying and suggesting a time or opportunity to generate a sequel article by parsing each of one or more prior articles and extracting identified information therefrom. Such information can include, for example, entities and events mentioned in the prior article(s), relationships between the entities and events, contextual information pertaining to the prior article(s), facts stated in the prior article(s), information sources used in the prior article(s), future predictions offered in the prior article(s), mentions of potential future events, etc. Based on such information, at least one embodiment of the invention can include using a rule-based system (such as further detailed below in connection with FIG. 2) to identify one or more (temporal) opportunities for writing a sequel article.

Figure 1:
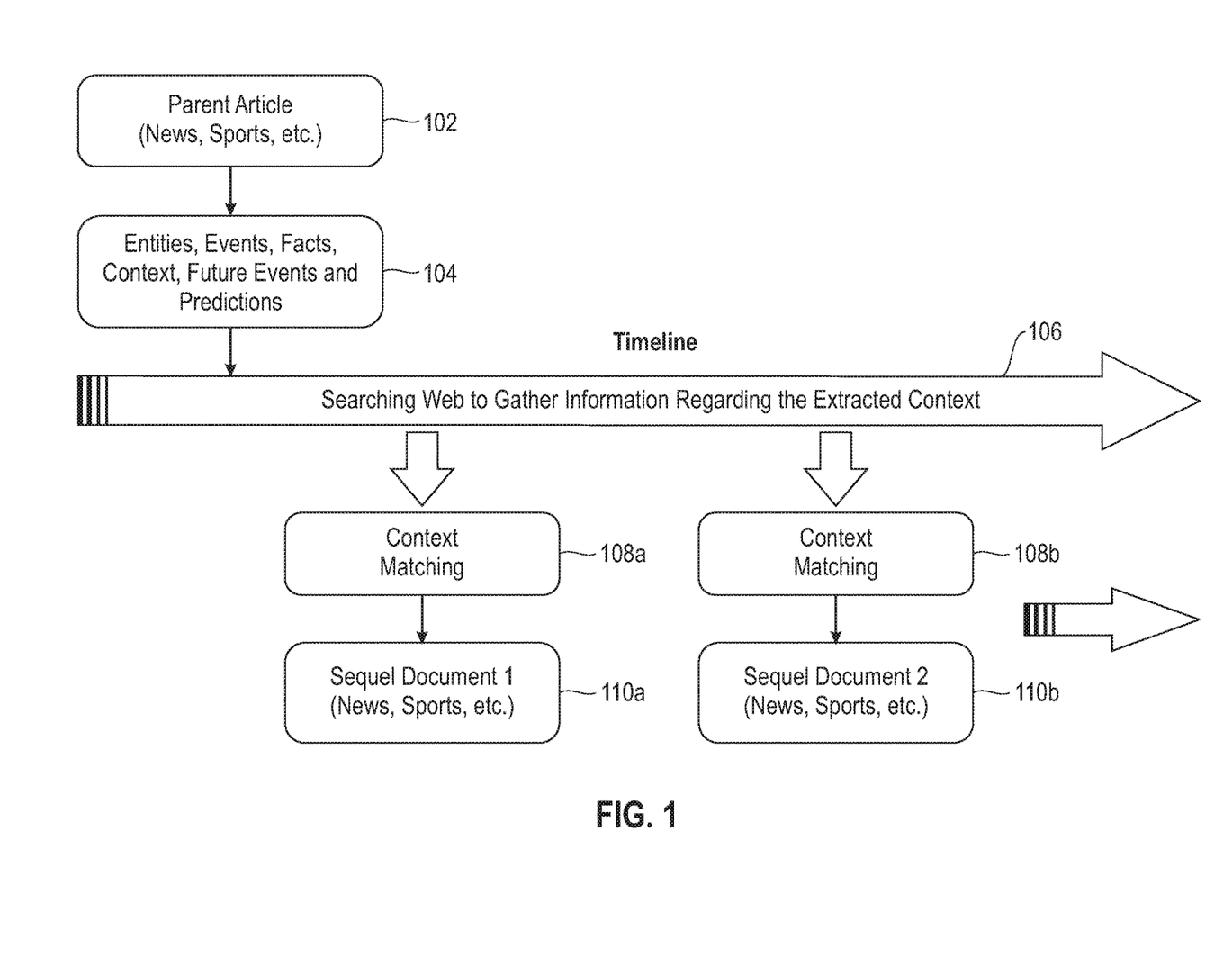
FIG. 1 is a flow diagram illustrating techniques according to an embodiment of the present invention.

FIG. 1 is a flow diagram illustrating techniques according to an embodiment of the present invention. By way of illustration, FIG. 1 depicts a parent article 102 (pertaining to one or more topics such as news, sports, etc.), from which information 104 is extracted. Such information can include, for example, entities, events, facts, context, future events, predictions, etc. Subsequently, process 106 includes searching web sources to gather information pertaining to the extracted information 104. Based on such gathered information, context matching processes 108a and 108b can be carried out to identify opportunities for generating sequel documents (such as 110a and 110b). Considering the above-noted de-monetization example, at least one embodiment can include context matching in the form of continuously monitoring data sources to determine if the growth rate is moving below 5%.

Figure 2:
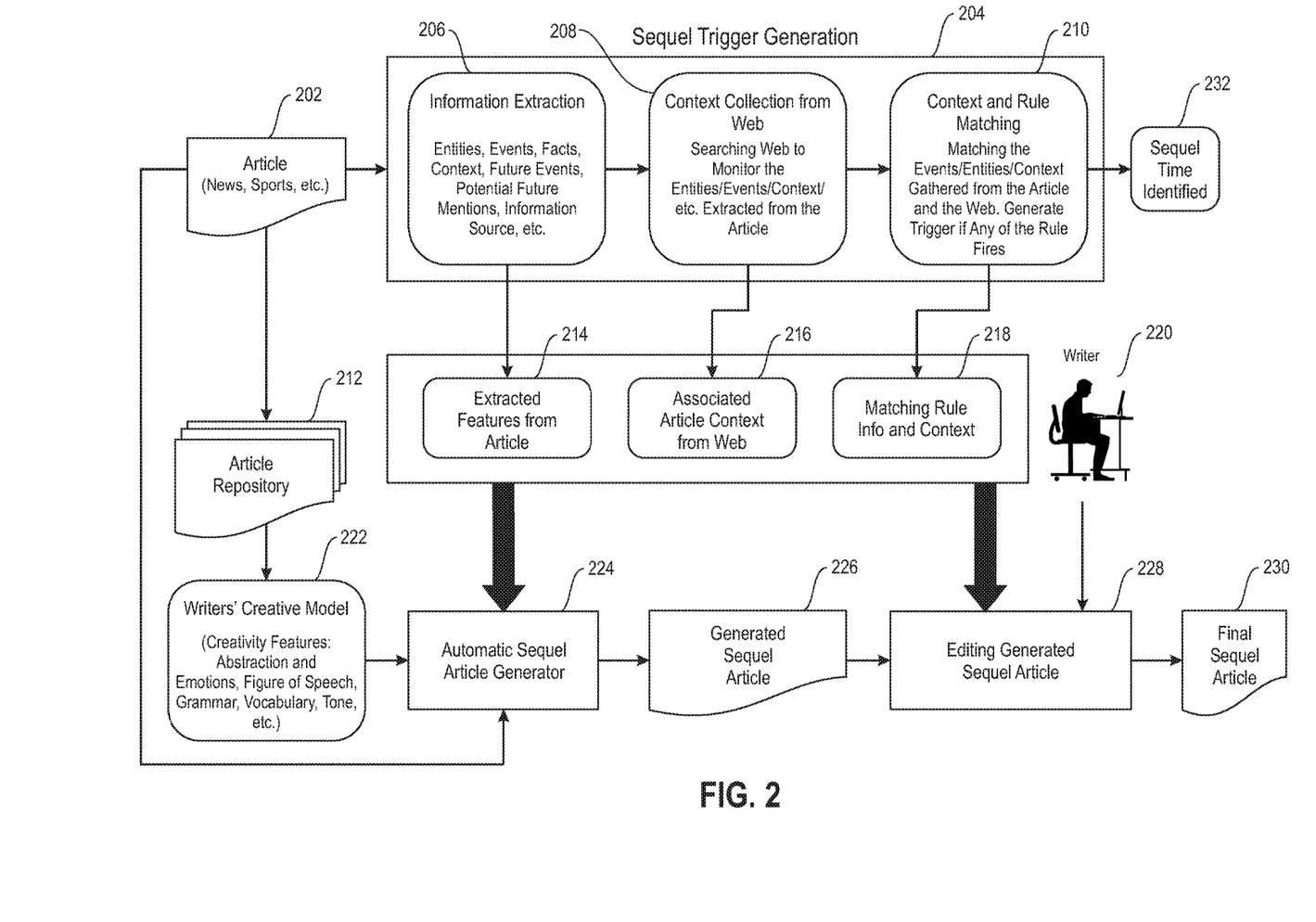
FIG. 2 is a diagram illustrating system architecture, according to an embodiment of the invention.

FIG. 2 is a diagram illustrating system architecture, according to an embodiment of the invention. By way of illustration, FIG. 2 depicts an original/prior written article 202, which is processed by a sequel trigger generation component 204. The sequel trigger generation component 204 includes an information extraction component 206, a context collection component 208, and a context and rule matching component 210. The information extraction component 206 extracts various information from the article 202, such as events, entities, relationships between the events and entities, future predictions, mentions of potential future events, assumptions on which the article 202 is based, sources of information mentioned in the article 202, etc.

The context collection component 208 searches the web to monitor the entities, events, context, etc. extracted from the article 202 by the information extraction component 206. The context and rule matching component 210 matches the entities, events, context, etc. extracted from the article 202 by the information extraction component 206 and gathered from the web by the context collection component 208. Additionally, the context and rule matching component 210 generates an alert and/or trigger if any of one or more rules is implicated (fire). A user can, for example, set the threshold accordingly; if the user wants a high level of confidence, then it is possible that multiple rules are to be implicated prior to fire. Based on the alert and/or trigger, the context and rule matching component 210 generates and outputs a sequel article opportunity time 232.

As additionally detailed herein, in one or more embodiments of the invention, the sequel trigger generation component 204 can be implemented as a rule-based system which can generate triggers when one of the rules contained therein fire. If more than one rule fires, an enhanced trigger is generated. The rules can be constituted by the information extracted from the article 202 by the information extraction component 206. The following example rules can be implemented in one or more embodiments of the invention. One rule indicates that if the article contains a future prediction or a future mention, a trigger is generated when the future prediction is rendered true or false, or when the time of the future mention arrives/passes. For example, suppose an article mentions "I expect the growth rate to fall to 4% by the end of the year due to demonetization." In such an example, a trigger is generated and sent whenever the growth rate falls to 4%. The information extraction component 206 can extract this prediction from the article and the context collection component 208 can then search the web to ascertain that/when the rate is at 4%.

Another example rule indicates that a trigger is generated if/when the assumptions on which an article is written change. For instance, consider a development denoting that Pluto is declassified as a planet due to the changes in the definition of a planet, and a person then writes a detailed article regarding why Pluto is no longer a planet. If the definition of a planet changes again, the trigger can be generated and sent to the author. The author can then write a follow-up article on the implications of the changed definition on Pluto's planetary status. Yet another example rule indicates that a trigger is generated if the same events happen in the same context, but the entities are different. For example, assume that an author writes an article when Person X leaves as company director and Person Y joins as company director. When Person Y subsequently leaves as company director, a trigger can be generated and sent. Further, another example rule indicates that a trigger is generated if the same events happen in different contexts. For example, assume that an author writes an article about a policy with respect to a first city. If the policy is later applied to a second city, a trigger can be generated suggesting that the author write a sequel article about the success/failure of this new instance of the policy.

Referring again to FIG. 2, the article 202 becomes part of the article repository 212, which can be utilized in creating a writer's creative model 222 (which can include creativity features such as abstraction and emotions, figures-of-speech, grammar rules, vocabulary preferences, tone usage, etc.). The article 202, the writer's creative model 222, and input from the sequel trigger generation component 204 can be provided to an automatic sequel article generator 224, which uses the noted information to generate a sequel article 226 (that is, a follow-up article to article 202). The above-noted input from the sequel trigger generation component 204 can include extracted features 214 from the article 202 (extracted via component 206), associated article context 216 from the web (gathered via component 208), and matching rule information and context 218 (generated via component 210).

The content of the sequel article 226 may explicitly refer to the parent article 202. For example, text of the sequel article 226 might include sentences such as, "As outlined in my earlier article two months ago," "Let us review the predictions we previously made," etc. As noted, a writer's creative writing model 222 is also an input to the automatic sequel article generator 224, whereby the model can be used to ensure that the text of the sequel article 226 is generated in a manner that is consistent with the writer's style.

As also depicted in FIG. 2, inputs from the sequel trigger generation component 204 as well as input from the writer 220 can be used to edit the generated sequel article (via editing component 228), thereby generating a final generated sequel article 230. By way of example, the writer 220 might want to edit the content of the sequel article 226, or might want to add clarity to portions of content in the sequel article 226. During the editing process, at least one embodiment of the invention can include providing an explanation of one or more portions of content in the generated sequel article 226, why those portions of content have been included, from where those portions of content have been derived, etc. Also, the writer 220 may want to shorten the generated sequel article 226 and/or remove specific information from the generated sequel article 226. In such an instance, one or more embodiments of the invention can include accommodating such requests, making the corresponding modifications to the generated sequel article 226, and generate the final version of the sequel article 230.

Figure 3:
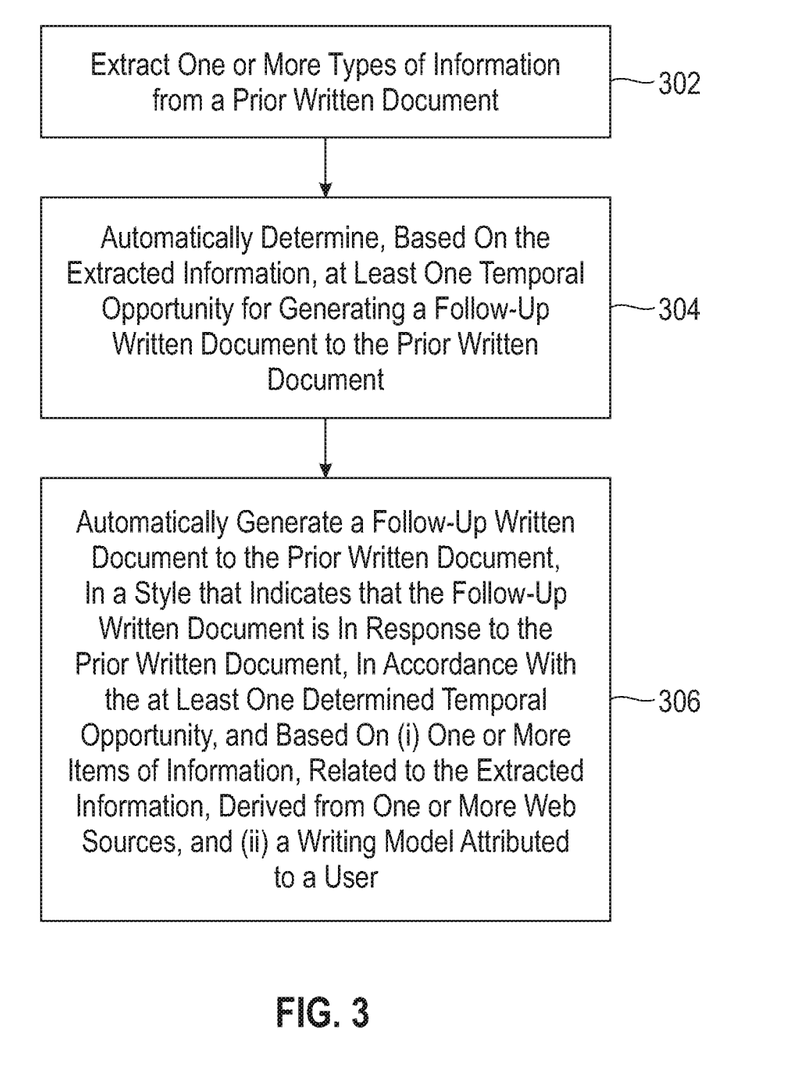
FIG. 3 is a flow diagram illustrating techniques according to an embodiment of the invention.

FIG. 3 is a flow diagram illustrating techniques according to an embodiment of the present invention. Step 302 includes extracting one or more types of information from a prior written document. The one or more types of information can include, for example, one or more entities mentioned in the prior written document, one or more events mentioned in the prior written document, one or more relationships between one or more entities mentioned in the prior written document and one or more events mentioned in the prior written document, contextual information pertaining to the prior written document, one or more facts mentioned in the prior written document, one or more information sources used in connection with the prior written document, one or more future predictions mentioned in the prior written document, one or more potential future events mentioned in the prior written document, and/or one or more assumptions on which the prior written document is based.

Step 304 includes automatically determining, based on the extracted information, at least one temporal opportunity for generating a follow-up written document to the prior written document. In one or more embodiments of the invention, automatically determining at least one temporal opportunity can include implementing a rule-based system. Such a rule-based system can include a rule indicating that if the prior written document contains a future prediction, a temporal opportunity for generating a follow-up written document is identified when the future prediction is rendered true or false. Also, such a rule-based system can include a rule indicating that if the prior written document contains an assumption on which the prior written document is based, a temporal opportunity for generating a follow-up written document is identified when the assumption changes. Additionally, such a rule-based system can include a rule indicating that if the prior written document mentions an event occurring in a given context with one or more entities, a temporal opportunity for generating a follow-up written document is identified when the event subsequently occurs in the given context with one or more different entities. Further, such a rule-based system can include a rule indicating that if the prior written document mentions an event occurring in a given context, a temporal opportunity for generating a follow-up written document is identified when the event subsequently occurs in a different context.

Step 306 includes automatically generating a follow-up written document to the prior written document, in a style that indicates that the follow-up written document is in response to the prior written document, in accordance with the at least one determined temporal opportunity, and based on (i) one or more items of information, related to the extracted information, derived from one or more web sources, and (ii) a writing model attributed to a user. Automatically generating a follow-up written document can include automatically generating a follow-up written document that is consistent in style to the user's writing style, based on the writing model attributed to the user.

At least one embodiment of the invention can also include outputting the generated follow-up written document to the user. In such an embodiment, the generated follow-up written document explicitly refers to the prior written document.

Also, an additional embodiment of the invention includes automatically suggesting, based on one or more types of information extracted from a prior written document, a temporal opportunity for generating a follow-up written document to the prior written document. Such an embodiment can also include automatically generating, at the suggested temporal opportunity, a follow-up written document to the prior written document based on (i) one or more items of information, related to the extracted information, derived from one or more web sources, and (ii) a writing model attributed to a user. Additionally, such an embodiment can include displaying the generated follow-up written document to the user, enabling the user to edit the generated follow-up written document, automatically generating an updated version of the follow-up written document based on editing carried out by the user, and outputting the updated version of the follow-up written document to the user.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives prior article information sent from a data source to the transmission server. The server can process the information, for example, based upon user-provided user preference information that is stored in memory on the server. Subsequently, an alert is generated containing a suggestion for a sequel article opportunity and/or a generated sequel article. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
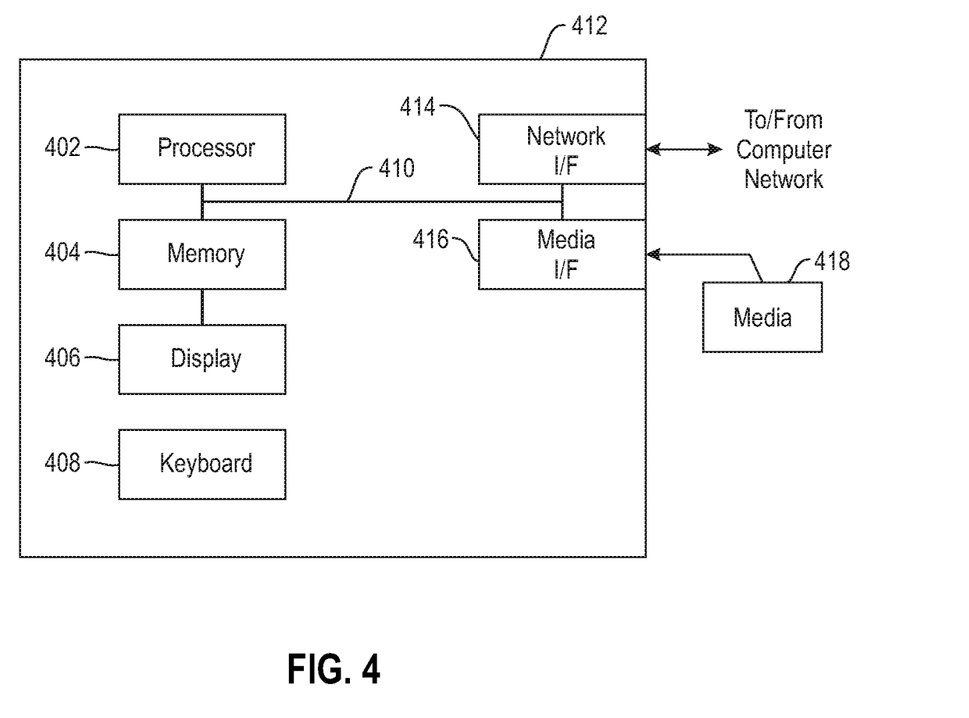
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
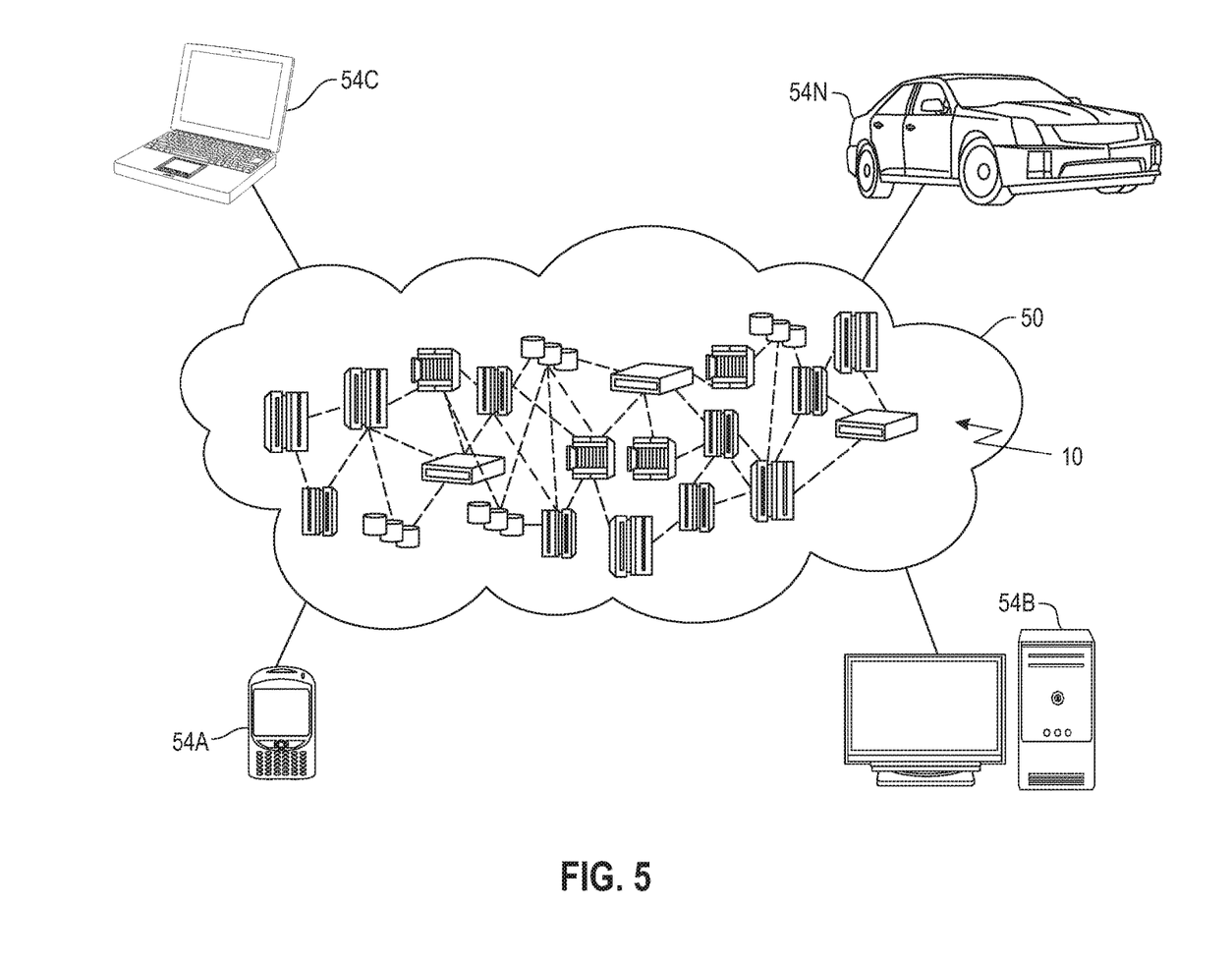
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
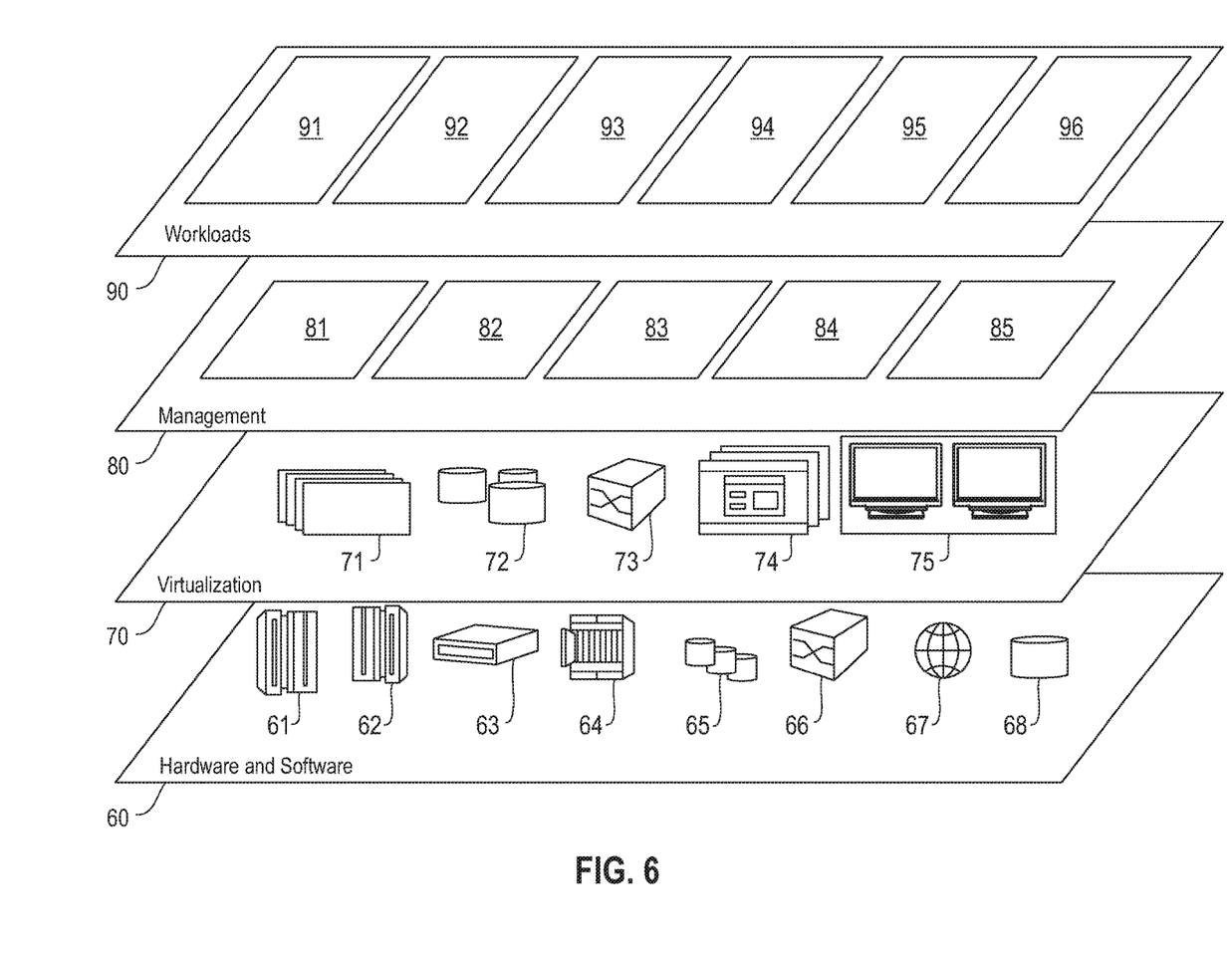
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assistive creative AI 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, identify opportunities for (and subsequently assisting via AI in) writing a sequel article.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising the steps of:
   extracting one or more types of information from a prior written document;
   automatically determining, based on the extracted information, at least one temporal opportunity for generating a follow-up written document to the prior written document; and
   automatically generating a follow-up written document to the prior written document, the follow-up written document being written in a style that indicates that it is in response to the prior written document, in accordance with the at least one determined temporal opportunity, and based on (i) one or more items of information, related to the extracted information, derived from one or more web sources, and (ii) a writing model attributed to a user;
   wherein the steps are carried out by at least one computing device.

2. The computer-implemented method of claim 1, wherein the one or more types of information comprise one or more entities mentioned in the prior written document.

3. The computer-implemented method of claim 1, wherein the one or more types of information comprise one or more events mentioned in the prior written document.

4. The computer-implemented method of claim 1, wherein the one or more types of information comprise one or more relationships between (i) one or more entities mentioned in the prior written document and (ii) one or more events mentioned in the prior written document.

5. The computer-implemented method of claim 1, wherein the one or more types of information comprise contextual information pertaining to the prior written document.

6. The computer-implemented method of claim 1, wherein the one or more types of information comprise one or more facts mentioned in the prior written document.

7. The computer-implemented method of claim 1, wherein the one or more types of information comprise one or more information sources used in connection with the prior written document.

8. The computer-implemented method of claim 1, wherein the one or more types of information comprise one or more future predictions mentioned in the prior written document.

9. The computer-implemented method of claim 1, wherein the one or more types of information comprise one or more potential future events mentioned in the prior written document.

10. The computer-implemented method of claim 1, wherein the one or more types of information comprise one or more assumptions on which the prior written document is based.

11. The computer-implemented method of claim 1, wherein said automatically determining at least one temporal opportunity comprises implementing a rule-based system.

12. The computer-implemented method of claim 11, wherein the rule-based system comprises a rule indicating that if the prior written document contains a future prediction, a temporal opportunity for generating a follow-up written document is identified when the future prediction is rendered true or false.

13. The computer-implemented method of claim 11, wherein the rule-based system comprises a rule indicating that if the prior written document contains an assumption on which the prior written document is based, a temporal opportunity for generating a follow-up written document is identified when the assumption changes.

14. The computer-implemented method of claim 11, wherein the rule-based system comprises a rule indicating that if the prior written document mentions an event occurring in a given context with one or more entities, a temporal opportunity for generating a follow-up written document is identified when the event subsequently occurs in the given context with one or more different entities.

15. The computer-implemented method of claim 11, wherein the rule-based system comprises a rule indicating that if the prior written document mentions an event occurring in a given context, a temporal opportunity for generating a follow-up written document is identified when the event subsequently occurs in a different context.

16. The computer-implemented method of claim 1, wherein the generated follow-up written document explicitly refers to the prior written document.

17. The computer-implemented method of claim 1, wherein said automatically generating a follow-up written document comprises automatically generating a follow-up written document having a style that is consistent with the user's writing style, based on the writing model attributed to the user.

18. A computer program product comprising a computer readable storage medium having program instructions embodied therewith, the program instructions executable by a computing device to cause the computing device to:
   extract one or more types of information from a prior written document;
   automatically determine, based on the extracted information, at least one temporal opportunity for generating a follow-up written document to the prior written document; and
   automatically generate a follow-up written document to the prior written document, the follow-up written document being written in a style that indicates that it is in response to the prior written document, in accordance with the at least one determined temporal opportunity, and based on (i) one or more items of information, related to the extracted information, derived from one or more web sources, and (ii) a writing model attributed to a user.

19. A system comprising:
   a memory; and
   at least one processor operably coupled to the memory and configured for:
      extracting one or more types of information from a prior written document;
      automatically determining, based on the extracted information, at least one temporal opportunity for generating a follow-up written document to the prior written document; and
      automatically generating a follow-up written document to the prior written document, the follow-up written document being written in a style that indicates that it is in response to the prior written document, in accordance with the at least one determined temporal opportunity, and based on (i) one or more items of information, related to the extracted information, derived from one or more web sources, and (ii) a writing model attributed to a user.

20. A computer-implemented method, the method comprising steps of:
   automatically suggesting, based one or more types of information extracted from a prior written document, a temporal opportunity for generating a follow-up written document to the prior written document;
   automatically generating, at the suggested temporal opportunity, a follow-up written document to the prior written document based on (i) one or more items of information, related to the extracted information, derived from one or more web sources, and (ii) a writing model attributed to a user;
   displaying the generated follow-up written document to the user;
   enabling the user to edit the generated follow-up written document;
   automatically generating an updated version of the follow-up written document based on editing carried out by the user; and
   outputting the updated version of the follow-up written document to the user;
   wherein the steps are carried out by at least one computing device.

* * * * *